(12) United States Patent
Han et al.

(10) Patent No.: US 10,565,464 B2
(45) Date of Patent: Feb. 18, 2020

(54) ADAPTIVE CLOUD OFFLOADING OF MOBILE AUGMENTED REALITY

(71) Applicant: AT&T Intellectual Property I, L.P., Atlanta, GA (US)

(72) Inventors: Bo Han, Bridgewater, NJ (US); Vijay Gopalakrishnan, Edison, NJ (US); Shuai Hao, Hillsborough, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/851,370

(22) Filed: Dec. 21, 2017

(65) Prior Publication Data

US 2019/0197339 A1 Jun. 27, 2019

(51) Int. Cl.
| | |
|---|---|
| G06K 9/46 | (2006.01) |
| G06F 9/455 | (2018.01) |
| G06T 11/60 | (2006.01) |
| H04L 29/08 | (2006.01) |

(52) U.S. Cl.
CPC ....... *G06K 9/4604* (2013.01); *G06F 9/45512* (2013.01); *G06T 11/60* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,129,429 B2 | 9/2015 | Hammond | |
| 9,285,871 B2 | 3/2016 | Geisner et al. | |
| 9,633,447 B2 | 4/2017 | Swaminathan et al. | |
| 9,672,660 B2 | 6/2017 | Mullins | |

(Continued)

FOREIGN PATENT DOCUMENTS

| | | |
|---|---|---|
| KR | 101465879 KR | 11/2014 |
| WO | WO 2017/067586 | 4/2017 |
| WO | WO 2017/112866 | 6/2017 |

OTHER PUBLICATIONS

Huang et al., "CloudRidAR: A Cloud-based Architecture for Mobile Augmented Reality", Jun. 16, 2014.*

(Continued)

*Primary Examiner* — Hilina K Demeter
(74) *Attorney, Agent, or Firm* — Hartman & Citrin LLC

(57) ABSTRACT

Concepts and technologies for adaptive cloud offloading of mobile augmented reality are provided herein. In an embodiment, a method can include receiving, by an augmented reality system, an acquired image frame captured by an acquisition device. The acquired image frame can indicate a plurality of acquired image frame parameters. The method can include determining, by the augmented reality system, a plurality of augmented reality process instances. The method can include determining a plurality of local feature extraction time estimates based on the plurality of acquired image frame parameters, where a local feature extraction time estimate is created for each of the plurality of the augmented reality process instances. The method can include obtaining a network condition measurement, and generating a plurality of offload commands based on the network condition measurement and at least one of the plurality of local feature extraction time estimates.

20 Claims, 5 Drawing Sheets

(56) References Cited

U.S. PATENT DOCUMENTS

| | | | |
|---|---|---|---|
| 9,727,977 | B2 | 8/2017 | Mullins et al. |
| 9,865,058 | B2* | 1/2018 | Mullins ................. G06T 19/006 |
| 9,983,670 | B2* | 5/2018 | Coleman .............. A61B 5/0006 |
| 9,984,499 | B1* | 5/2018 | Jurgenson ............... G06T 17/00 |
| 9,990,759 | B2* | 6/2018 | Mullins .................. H04L 67/04 |
| 2012/0243732 | A1* | 9/2012 | Swaminathan .... G06K 9/00671 382/103 |
| 2014/0111544 | A1* | 4/2014 | Hammond ........... G06T 19/006 345/633 |
| 2014/0143785 | A1 | 5/2014 | Mistry et al. |
| 2014/0156735 | A1* | 6/2014 | Yamasaki ............... H04L 69/28 709/203 |
| 2014/0285519 | A1* | 9/2014 | Uusitalo .............. H04W 4/029 345/633 |
| 2014/0315570 | A1* | 10/2014 | Yun ..................... H04W 64/003 455/456.1 |
| 2015/0032838 | A1* | 1/2015 | Demsey ............. H04L 67/2842 709/213 |
| 2015/0220371 | A1 | 8/2015 | Yang et al. |
| 2015/0235474 | A1* | 8/2015 | Mullins ................. G06T 19/006 345/419 |
| 2016/0180602 | A1 | 6/2016 | Fuchs |
| 2016/0212065 | A1 | 7/2016 | To et al. |
| 2016/0247324 | A1 | 8/2016 | Mullins et al. |
| 2016/0292920 | A1 | 10/2016 | Sprock et al. |
| 2017/0004019 | A1 | 1/2017 | Hui et al. |
| 2017/0048876 | A1 | 2/2017 | Mahindra et al. |
| 2017/0132841 | A1 | 5/2017 | Morrison |
| 2017/0164237 | A1 | 6/2017 | Mahmoodi et al. |
| 2017/0249774 | A1 | 8/2017 | Mullins |

OTHER PUBLICATIONS

Chung et al. "Adaptive Cloud Offloading of Augmented Reality Applications on Smart Devices for Minimum Energy Consumption", Aug. 31, 2015 (Year: 2015).*

Jain et al., OverLay: Practical Mobile Augmented Reality, May 2015 (Year: 2015).*

Kaist et al., A Virtual Cloud Computing Provider for Mobile Devices, Jun. 2010 (Year: 2010).*

Chung et al., "Adaptive Cloud Offloading of Augmented Reality Applications on Smart Devices for Minimum Energy Consumptions" (Year: 2015).*

Verbelen et al., "Cloudlets: Bringing the cloud to the mobile user," Proceedings of the Third ACM Workshop on Mobile Cloud Computing and Services, Jun. 25-29, 2012, pp. 29-36, ACM 2012.

Soyata et al., "Cloud-Vision: Real-time Face Recognition Using a Mobile-Cloudlet-Cloud Acceleration Architecture," 2012 IEEE Symposium on Computers and Communications, Jul. 1-4, 2012, pp. 59-66, IEEE 2012.

Lin et al., "The Design of Cloud-based 4G/LTE for Mobile Augmented Reality with Smart Mobile Devices," 2013 IEEE Seventh International Symposium on Service-Oriented System Engineering, Mar. 25-28, 2013, pp. 561-566, IEEE 2013.

Harvey et al., "EDOS: Edge Assisted Offloading System for Mobile Devices," 2017 26th International Conference on Computer Communication and Networks (ICCCN), Jul. 31, 2017-Aug. 3, 2017, pp. 1-9.

Al-Shuwaili et al., "Energy-Efficient Resource Allocation for Mobile Edge Computing-Based Augmented Reality Applications," IEEE Wireless Communications Letters, Mar. 25, 2017.

Chung et al., "Adaptive Cloud Offloading of Augmented Reality Applications on Smart Devices for Minimum Energy Consumption," KSII Transactions on Internet and Information Systems, vol. 9, No. 8, Aug. 31, 2015, KSII 2015.

Toma et al., "Computation Offloading for Frame-Based Real-Time Tasks under Given Server Response Time Guarantees," Leibniz Transactions on Embedded Systems, Nov. 14, 2014, vol. 1, Issue 2, Article No. 2, pp. 02:1-02:21.

Wang, Junyi et al., "Adaptive Application Offloading Decision and Transmission Scheduling for Mobile Cloud Computing," China Communications vol. 14, Issue 3, Mar. 20, 2017, pp. 169-181.

* cited by examiner

ADAPTIVE CLOUD OFFLOADING OF MOBILE AUGMENTED REALITY

BACKGROUND

Mobile communication devices, such as smartphones and tablets, have become an integral part of many people's lives. Many people use these devices as an aid for researching, comparing, and interacting with the real-world environment. Mobile communication devices can implement Augmented Reality (AR) techniques via the use of an acquisition device, such as a camera, to present a live view of physical objects within a real-world environment and augment the scene of the real-world environment with additional information. Conventional AR techniques can insert virtual objects onto a display that shows a user's view of the real-world environment. Over the past several years, AR techniques have been introduced on mobile communication devices and other user equipment, such as wearable devices, by making use of the cameras and other acquisition devices that capture images with high-resolution. Although many acquisition devices can acquire visually stunning images, a conventional AR system may be subjected to processor intensive operations that can affect the AR experience for the user. Moreover, conventional AR computing systems typically draw energy from a relatively constant power source (e.g., an external power supply via a wall outlet), thereby limiting the mobility of the user.

SUMMARY

The present disclosure is directed to adaptive cloud offloading of mobile augmented reality using acquired image frames. According to one aspect of the concepts and technologies disclosed herein, a method is disclosed. The method can include receiving, by an augmented reality system, an acquired image frame captured by an acquisition device. The acquired image frame can indicate a plurality of acquired image frame parameters. The method also can include determining, by the augmented reality system, a plurality of augmented reality process instances. In some embodiments, determining the plurality of augmented reality process instances can include retrieving, by the augmented reality system, augmented reality process identifiers corresponding to the plurality of augmented reality process instances. The method can further include determining, by the augmented reality system, a plurality of local feature extraction time estimates based on the plurality of acquired image frame parameters. In some embodiments, a local feature extraction time estimate is determined for each of the plurality of the augmented reality process instances. The method can also include obtaining, by the augmented reality system, a network condition measurement. The method can further include generating, by the augmented reality system, a plurality of offload commands for augmenting the acquired image frame. Each offload command can be associated with a respective one of the plurality of augmented reality process instances. In some embodiments, generating the plurality of offload commands can be based on the network condition measurement and at least one of the plurality of local feature extraction time estimates. In some embodiments, generating the plurality of offload commands can be based on determining whether a dynamic acquired image frame parameter associated with the acquired image frame exceeds an offload time differential threshold for each of the plurality of augmented reality process instances.

In some embodiments, each offload command includes one of a command to offload the acquired image frame as a raw file to a cloud server, or a command to offload feature points from the acquired image frame to the cloud server. In some embodiments, the command to offload the feature points from the acquired image frame to the cloud server is based on determining that the dynamic acquired image frame parameter exceeds the offload time differential threshold corresponding to one of the plurality of augmented reality process instances. In some embodiments, the feature points can be generated from the acquired image frame via implementing an augmented reality process instance associated with one of the augmented reality process identifiers. The method also can include activating, by the augmented reality system, one of the plurality of offload commands for the acquired image frame.

According to another aspect of the concepts and technologies disclosed herein, an augmented reality system is disclosed. The augmented reality system can include a processor and a memory. The memory can store computer-executable instructions that, when executed by the processor, cause the processor to perform operations. The operations can include receiving an acquired image frame captured by an acquisition device. The acquired image frame can indicate a plurality of acquired image frame parameters. The operations also can include determining a plurality of augmented reality process instances. In some embodiments, determining the plurality of augmented reality process instances can include retrieving augmented reality process identifiers corresponding to a plurality of augmented reality process instances. The operations also can include determining a plurality of local feature extraction time estimates based on the plurality of acquired image frame parameters. A respective local feature extraction time estimate can be determined for each of the plurality of the augmented reality process instances. The operations also can include obtaining a network condition measurement. The operations also can include generating a plurality of offload commands for augmenting the acquired image frame. In some embodiments, generating the plurality of offload commands can be based on the network condition measurement and at least one of the plurality of local feature extraction time estimates. In some embodiments, generating the plurality of offload commands can be based on determining whether a dynamic acquired image frame parameter associated with the acquired image frame exceeds an offload time differential threshold for each of the plurality of augmented reality process instances.

In some embodiments, each offload command can be associated with a respective one of the plurality of augmented reality process instances. In some embodiments, each offload command includes one of a command to offload the acquired image frame as a raw file to a cloud server, or a command to offload feature points from the acquired image frame to the cloud server. In some embodiments, the command to offload the feature points from the acquired image frame to the cloud server can be based on determining that the dynamic acquired image frame parameter exceeds the offload time differential threshold corresponding to one of the plurality of augmented reality process instances. In some embodiments, the feature points can be generated from the acquired image frame via implementing an augmented reality process instance associated with one of the augmented reality process identifiers. In some embodiments, the operations can also include activating one of the plurality of offload commands for the acquired image frame.

According to yet another aspect, a computer storage medium is disclosed. The computer storage medium can have computer-executable instructions stored thereon. When the computer-executable instructions are executed by a processor, the processor can perform operations including receiving an acquired image frame captured by an acquisition device. The acquired image frame can indicate a plurality of acquired image frame parameters. The operations can also include determining a plurality of augmented reality process instances. In some embodiments, determining the plurality of augmented process instances can include retrieving augmented reality process identifiers corresponding to a plurality of augmented reality process instances. The operations also can include determining a plurality of local feature extraction time estimates based on the plurality of acquired image frame parameters. In some embodiments, a respective local feature extraction time estimate is determined for each of the plurality of the augmented reality process instances. The operations also can include obtaining a network condition measurement. The operations can also include generating a plurality of offload commands for augmenting the acquired image frame based on the network condition measurement and at least one of the plurality of local feature extraction time estimates. In some embodiments, generating the plurality of offload commands can be based on determining whether a dynamic acquired image frame parameter associated with the acquired image frame exceeds an offload time differential threshold for each of the plurality of augmented reality process instances. In some embodiments, each offload command is associated with a respective one of the plurality of augmented reality process instances. In some embodiments, each offload command includes one of a command to offload the acquired image frame as a raw file to a cloud server, or a command to offload feature points from the acquired image frame to the cloud server. The command to offload the feature points from the acquired image frame to the cloud server can be based on determining that the dynamic acquired image frame parameter exceeds the offload time differential threshold corresponding to one of the plurality of augmented reality process instances. In some embodiments, the operations can further include activating one of the plurality of offload commands for the acquired image frame.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
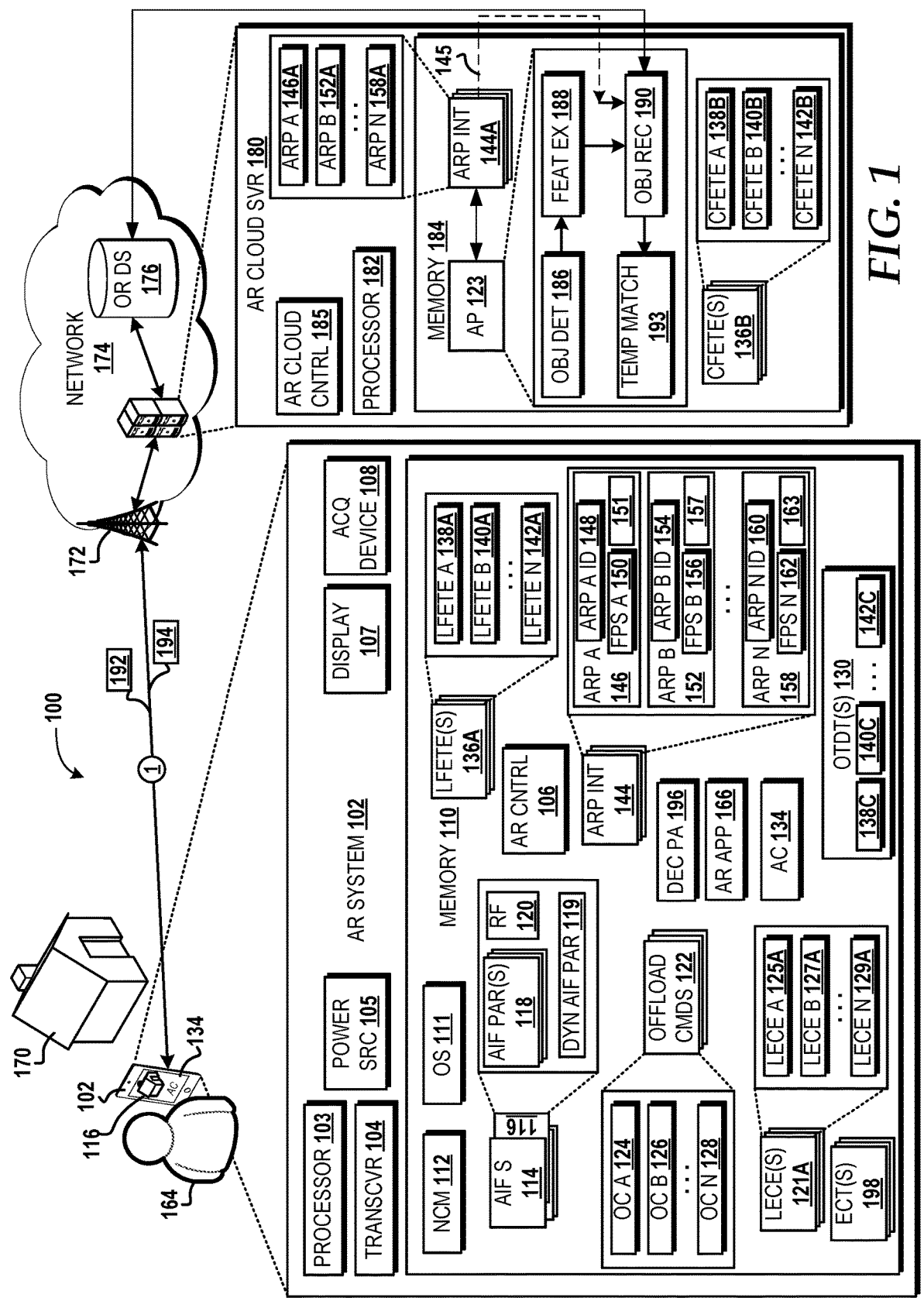
FIG. 1 is a system diagram illustrating an operating environment that includes an augmented reality system for providing cloud offloading of mobile augmented reality for various embodiments of the concepts and technologies described herein.

The following detailed description is directed to dynamic cloud offloading to facilitate mobile augmented reality. "Augmented Reality" (AR) is used herein to describe a computing concept in which at least a portion of a physical, real-world environment is augmented to include computer-generated data that is presented as an overlay of and/or spatially integrated with content on a display. The computer-generated data can include virtual objects that are presented over and/or spatially integrated with real-world objects of the physical, real-world environment through presentation on a display. The virtual objects can include text, colors, patterns, gradients, graphics, other images, videos, animations, combinations thereof, and the like. Computer-generated data that augments in some manner a view of a physical, real-world environment and/or elements thereof is referred to herein generally as "augmentation" (or variants thereof, such as "augmenting"), and a visual representation of the computer-generated data can be presented as "augmentation content" (AC) for a user to view on a display.

Augmented Reality (AR) has drawn tremendous attention from both the technical industry and the research community. A conventional mobile AR system may use a camera to provide a camera feed as an input and may locate objects of interest in the current view of the camera using object recognition and/or object detection. Yet as AR is trending towards increased implementation on mobile devices, the recognition of surrounding objects for augmentation may demand large datasets and processing resources from the conventional mobile AR device, thereby leading to increased battery depletion and processor utilization. Some conventional techniques to address the increased storage requirements and processor demands have been to defer all processing and data storage to one or more remote servers. However, network communication channels may not always have enough capacity to handle the transfer of every type of data in all situations. As such, conventional mobile AR devices can incur lag in processing and augmentation, which is often undesirable to a user.

Embodiments of the present disclosure provide an AR system that can receive an acquired image frame and/or select one acquired image frame from a stream of acquired image frames. For example, the acquired image frame can be an image captured by an acquisition device, such as a camera. The acquired image frame can indicate parameters such as an image size, time identifier, and/or an application identifier corresponding to an application that prompted the acquisition device to capture an object that is depicted within the acquired image frame. The AR system can store multiple AR process instances in memory. Each AR process instance can be associated with a processing module that can implement a particular AR algorithm that can provide AR related processing, such as object detection, feature extraction, object recognition, template matching, a combination thereof, or the like. Each AR process instance can have an identifier. When a particular AR process instance is executed, that AR process instance can produce, extract, or otherwise create feature points from the acquired image frame so as to provide object recognition and/or object detection in order to facilitate augmentation. The amount of feature points can vary based on the particular acquired image frame, and thus a file size for the collective feature points for a particular acquired image frame also can vary. As used herein, a "feature point" refers to a structure (e.g., a two-dimensional pixel coordinate and/or a multi-dimensional description vector corresponding to an edge, an intersection, a color gradient change point, or other object) identified in an acquired image frame that can be used as input for object recognition.

In some embodiments, the AR system can create a feature point size mapping that includes estimates corresponding to how many feature points will likely be created when a particular augmented reality process instance is executed for acquired image frames of various file sizes. By this, when the AR system receives an acquired image frame of an acquired image frame stream from the acquisition device, the AR system can use an acquired image parameter (e.g., a file size of the acquired image frame) to determine a file size for the feature points (i.e., feature point size) that would be created using a particular AR process instance for the acquired image frame. The AR system can determine the feature point size for each AR process instance based on a parameter of the acquired image frame, such as the file size of the acquired image frame. Thus, in some embodiments, when the AR system receives an acquired image frame, the AR system can use the parameters of the acquired image frame in determining which AR process instance should be used to implement augmentation of the acquired image frame. In some embodiments, the AR system can create local feature extraction time estimates based on the acquired image frame parameters. A local feature extraction time estimate can be determined and/or created for each AR process instance. The local feature extraction time estimate can provide an estimated time that it would take to extract feature points from the acquired image frame if the AR system were to execute the particular AR process instance to extract feature points from the acquired image frame. The local feature extraction time estimate can be determined based on a feature point size that would be produced by a particular AR process instance, specifications of the processor executing the particular AR process instance (e.g., clock speed, cache speed, etc.), and/or specification of the memory storing the AR process instances (e.g., maximum transfer rate, amount of memory, etc.). The AR system can, in some embodiments, be executed on a mobile communication device or other user equipment that is not relegated to a fixed location and can communicatively couple with a network, such as a wireless network. In some embodiments, the AR system also can determine and/or obtain a cloud feature extraction time estimate based on the acquired image frame parameters of the acquired image frame. The cloud feature extraction time estimate can provide an estimated time that would take for an AR cloud server to process and extract feature points from the acquired image frame using the same AR process instance that could be executed on the AR system. The extraction of feature points can be performed by the AR cloud server when, in some embodiments, the AR system offloads the acquired image frame as a raw file to the AR cloud server. However, the AR system can determine whether the feature point extraction should be performed locally by the AR system (e.g., executing on a mobile communication device) using a particular AR process instance, or offloaded to the AR cloud server that can use the same or different AR process instance.

The AR system can obtain a network condition measurement of a communication path that communicatively couples the AR system with the AR cloud server. Using at least the network condition measurement and the acquired image frame parameters, the AR system can generate a dynamic acquired image frame parameter that accounts for a condition of the network (e.g., bandwidth, latency, throughput, etc.), while also factoring in the size of the acquired image frame and a file size for feature points that would be created should a particular AR process instance be implemented. The AR system can take the difference between the local feature extraction time estimate for a particular AR process instance and the corresponding cloud feature extraction time estimate for the same AR process instance in order to create an offload time differential threshold. In some embodiments, if the dynamic acquired image frame parameter is greater than the offload time differential threshold, then the AR system can generate an offload command that instructs the AR system to locally execute a particular AR process instance to create and/or extract feature points from the acquired image file, and send the extracted feature points to the AR cloud server for further processing to facilitate augmentation of the acquired image frame. However, if the dynamic acquired image frame parameter is not greater than the offload time differential threshold, then the AR system can create an offload command to offload the acquired image frame as a raw file to the AR cloud server so that the AR cloud server can execute a particular AR process instance to generate and/or extract feature points from the acquired image frame in addition to processing the feature points to facilitate augmentation of the acquired image frame. Once the AR cloud server has performed augmentation processing based on the offload command from the AR system, the AR cloud server can return augmented content that can be presented to the user via a display, such as by the augmented content being overlaid on top of the acquired image frame and/or another acquired image frame in a stream of acquired image frames. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for adaptive cloud offloading of mobile augmented reality will be described, according to an illustrative embodiment. The operating environment 100 shown in FIG. 1 includes an augmented reality (AR) computer system ("AR system") 102, a user 164, an object 170, and an AR cloud server computer system ("AR cloud server") 180 that is operating in communication with and/or as part of a communications network ("network") 174. The network 174 can include multiple networks, as will be described in greater detail below with reference to FIG. 3. The AR system 102 can communicatively couple with the AR cloud server 180 via an access point 172. In some embodiments, the AR system 102 can use a transceiver 104, to establish a communication path, such as the communication path 1, between the AR system 102 and the access point 172 of the network 174.

The AR system 102 can execute an operating system ("OS") 111 and one or more application programs, such as, for example, an AR application 166 and an AR controller application ("AR controller") 106. The OS 111 can include a computer program for controlling the operation of the AR system 102. The AR application 166 and the AR controller 106 can include executable instructions, modules, programs, routines, or other commands configured to execute on top of the OS 111 via a processor 103, to provide various operations discussed herein. The AR system 102 can include a memory 110, that can store the OS 111, the AR application 166, and the AR controller 106. In some embodiments, the AR system 102 can include a power source 105, such as a battery. In some embodiments, the power source 105 can enable the AR system 102 to be mobile in nature in order to allow for operation without having to be physically tethered to a power cord, at least for a period of time. In some embodiments, the AR system 102 can be configured to take the form of a mobile communication device, a tablet, a wearable computing device, a heads-up display computer system, a vehicle computing system, an attachable computing device, a camera, an appliance (e.g., a refrigerator, an oven, a microwave, etc.), a television, a handheld device, a mirror, a window, or other user equipment that can implement augmentation to view on a display or substrate (e.g., a piece of glass). It is understood that the examples discussed above are used for illustration purposes only, and therefore should not be construed to limit the scope of the disclosure in any way. It should be understood that the functionality of the AR system 102 can be provided by a single device, by two or more similar devices, and/or by two or more dissimilar devices. For purposes of describing the concepts and technologies disclosed herein, the AR system 102 is illustrated and described herein as a mobile communication device, such as a smartphone. It should be understood that this embodiment is illustrative, and should not be construed as being limiting in any way.

In some embodiments, the user 164 can power on the AR system 102 and launch the AR application 166. It is understood that the AR application 166 may not necessarily be intended for only providing augmented reality, but rather can be configured as a social media application, an electronic commerce application, a video conference application, an educational application, or other applications that may implement augmented reality. In some embodiments, the AR controller 106 can be a computer executable instruction set (e.g., a program module) that is embedded within the AR application 166. In other embodiments, the AR controller 106 can be a separate computer application and/or program that serves as an intermediary between the AR application 166 and the OS 111. In some embodiments, the AR system 102 can include an acquisition device 108 for capturing image data and a display 107 for presenting the image data. In some embodiments, the image data from the acquisition device 108, can be routed through the AR controller 106 prior to reaching the AR application 166. It is understood that the embodiments above are for illustration purposes only, and should not be construed as being limiting in any way.

In some embodiments, the AR system 102 (via execution of the AR application 166 and/or the AR controller 106) can provide a live view of a physical, real-world environment. In these embodiments, the AR system 102 may utilize the acquisition device 108 (e.g., an image system 532 shown in FIG. 5) to capture a live view of the physical, real-world environment, which can then be presenting to the user 164 via a display 107 of the AR system 102. For example, the user 164 can power on the AR system 102 and launch the AR application 166 and/or the AR controller 106, which in turn can activate the acquisition device 108 to capture a live view of the object 170. The object 170 can be presented on the display 107 of the AR system 102 as an acquired image frame (AIF) 116 that can be used for augmentation. In other embodiments, the AR system 102 can provide a non-live view of a physical, real-world environment. In these embodiments, the non-live view can present a physical, real-world and/or virtual environment as a virtual reality that allows for multi-dimensional engagement with an image, such as providing a three-hundred and sixty-degree image or video of the non-live view. Accordingly, a reality that is to be augmented need not be a present reality and can instead be a past reality, encapsulated in a photograph, a map, a virtual environment, or the like, that is augmented at a later time such as the present.

In some embodiments, the acquisition device 108 can provide an acquired image frame stream (AIF S) 114 that includes multiple AIFs, such as the AIF 116. Thus, the AIF 116 can be one of multiple AIFs within the AIF stream 114, according to an embodiment. The AIF 116 can be image data that represents an image captured by the acquisition device 108. In some embodiments, the AIF 116 can be configured to provide image data as a raw file, such as the raw file 120. The AIF 116 can have one or more AIF parameters, such as the AIF parameters 118. In some embodiments, the AIF parameter 118 can include an AIF size. The AIF size can give a memory size of the raw file 120 of the image captured by the AIF 116, such as via a measurement in kilobytes (KB). To provide a more efficient processing and data storage environment for facilitating augmentation on the AR system 102, the AR controller 106 can facilitate adaptive offloading for augmentation of the AIF 116. The adaptive offloading can occur via communication with the AR cloud server 180 so that the AR application 166 on the AR system 102 can present augmented content, such as the augmented content 134, overlaid (i.e., presented on top of) on the AIF 116 shown on the display 107. In some embodiments, the AIF parameters 118 can include an AR application identifier that can provide an association between the AIF 116 and the AR application 166 that initiated capture of the AIF 116. The AR application identifier can be a pointer that points to the AR application 166 so that the AR controller 106 can identify which application the AIF 116 corresponds. In some embodiments, the AIF parameters 118 can include a time identifier that indicates a time within the AIF stream 114 and/or a time that the AIF 116 was captured.

The memory 110 of the AR system 102 can store multiple AR process (ARP) instances, such as the plurality of ARP instances 144. As used herein, an "ARP instance" refers to a particular processing module (i.e., defined set of computer executable instructions that configure a processor, such as the processor 103) that can implement a particular AR process that can provide AR related computations, such as, for example, object detection, feature detection, feature extraction, object recognition, template matching, a combination thereof, or the like. Examples of an AR process that can be configured to correspond with one of the plurality of ARP instances 144 can include, but should not be limited to, the scale-invariant feature transformation algorithm, the compressed histogram of gradients algorithm, the speeded up robust features algorithm, the histogram of oriented gradients algorithm, the gradient location and orientation histogram algorithm, the oriented fast and rotated binary robust independent elementary features algorithm, a combination thereof, or other processes used in AR related processing. It is understood that the examples are provided for illustration purposes only, and therefore should not be construed as limiting in any way.

As shown in FIG. 1, the plurality of ARP instances 144 can include a first ARP instance (e.g., an ARP instance A 146), a second ARP instance (e.g., an ARP instance B 152), and additional ARP instances (e.g., an ARP instance N 158). It is understood that the terms "A", "B", and "N" refer to a numerical value corresponding to various amounts of ARP instances included within the plurality of ARP instances 144. It is understood that the terms "first" and "second" do not convey an order, precedence, hierarchy, or other importance, but instead are used for clarification and illustration purposes only. Moreover, although three ARP instances are illustrated in FIG. 1 (i.e., the ARP instance A 146, the ARP instance B 152, and the ARP instance N 158), it is understood that zero, one, two, three, or more than three ARP instances may be present within the memory 110. As such, the aspects illustrated in FIG. 1 are for illustration purposes only, and should not be construed as limiting in any way.

In some embodiments, each ARP instance can have an identifier, such as the ARP A ID 148 corresponding to the ARP instance A 146, the ARP B ID 154 corresponding to the ARP instance B 152, and ARP N ID 160 corresponding to the ARP instance N 158. The ARP identifier can indicate the AR process that would be implemented if a particular ARP instance was executed. In some embodiments, when a particular ARP instance is executed (e.g., any of the ARP instance A 146, the ARP instance B 152, and/or the ARP instance N 158), that AR process instance can produce, extract, or otherwise create feature points from the image data in the raw file 120 of the AIF 116. The amount of feature points from the image data in the raw file 120 of the AIF 116 can be provided in a feature point size (FPS) identifier, such as the FPS identifier A 150 corresponding to the amount of feature points produced and/or extracted using the ARP instance A 146, the FPS identifier B 156 corresponding to the amount of feature points produced and/or extracted using the ARP instance B 152, and the FPS identifier N 162 corresponding to the amount of feature points produced and/or extracted using the ARP instance N 158. The FPS identifier can indicate a memory size (e.g., measured in kilobytes (KB)) of the amount of feature points created when a particular ARP instance is applied (e.g., via execution) to the raw file 120 of the AIF 116. As such, the FPS identifier can vary based on the AIF size of the raw file 120 (as indicated by the AIF parameters 118) and based on the particular ARP instance being used.

The memory size indicated by each FPS identifier (e.g., the FPS identifier A 150, the FPS identifier B 156, and the FPS identifier N 162) may not necessarily be the same for each particular ARP instance. For example, in an embodiment, the ARP instance A 146 may implement the scale-invariant feature transformation algorithm that, when the ARP instance A 146 is applied to the raw file 120 of the AIF 116, can produce the feature points 151 that have a feature point size (e.g., indicated by the FPS identifier A 150) that is, for example, 100 KB. The AIF parameter 118 may indicate that the raw file 120 of AIF 116 has an AIF size of 105 KB. Continuing with this example, the ARP instance B 152 may implement the compressed histogram of gradients algorithm. Thus, when the ARP instance B 152 is executed, the feature points 157 are extracted from the raw file 120 of the AIF 116, and the feature points 157 can have a feature point size (e.g., indicated by the FPS identifier B 156) that is, for example, seventeen times smaller than then memory size indicated by the FPS identifier A 150 for the ARP instance A 146. Also, the ARP instance N 158 may implement an AR process that produces the feature points 163 yielding a feature point size (as indicated by the FPS identifier N 162) that is more than double the AIF size of 105 KB (as indicated by the AIF parameter 118 for the AIF 116). It is understood that the examples discussed above are for illustration purposes only, and therefore should not be construed as limiting in any way. In some embodiments, the FPS identifiers 150, 156, 162 can be determined by the AR controller 106 based on the AIF size indicated in the AIF parameters 118 for the AIF 116.

In some embodiments, the AR controller 106 can determine whether the AR system 102 is communicatively coupled to the network 174, and if so, check the current conditions of the network 174. The current conditions of the network 174 can be captured in a network condition measurement, such as the network condition measurement 112. Examples of network conditions can include, but should not be limited to the current bandwidth provided by the communication path 1 between the AR system 102 and the access point 172 of the network 174, end-to-end latency, and throughput available via the communication path 1. The bandwidth and the throughput can be measured in bits per second (e.g., megabits per second (Mbps)). The end-to-end latency can include network transfer latency. The network transfer latency can correspond with a time (e.g., measured in milliseconds (ms)) that it would take to offload and send data in an offload message, such as the offload message 192 that can include the raw file 120 and/or the extracted feature points (e.g., the feature points 151, 157, and/or 163 corresponding to the ARP instance A 146, the ARP instance B 152, and the ARP instance N 158, respectively), to the AR cloud server 180 via the communication path 1 and receive a response, such as the response message 194 that can include the augmented content 134, in return. In some embodiments, the network conditions can change dynamically over time, such as due to interference, scheduling of processes in the access point 172, the number of users served by the access point 172, or other network dynamics. Thus, in some embodiments, the network condition measurement 112 can include an average measurement (e.g., an average bandwidth) of the communication path 1 to the network 174 that will be used to offload a raw file from the AIF stream 114 (e.g., the raw file 120 of the AIF 116) or feature points from a frame of the AIF stream 114 (e.g., one or more of the feature points 151, 157, or 163 corresponding to ARP instances 144 of the AIF 116).

The AR controller 106 can generate a dynamic AIF parameter associated with an AIF, such as the dynamic AIF parameter 119 associated with the AIF 116. The dynamic AIF parameter 119 can be based on the AIF size indicated by the AIF parameters 118, the bandwidth indicated by the network condition measurement 112, and a feature point size indicated by at least one of the FPS identifiers (e.g., the FPS identifier A 150, the FPS identifier B 156, and/or the FPS identifier N 162). In some embodiments, the dynamic AIF parameter 119 can be determined by subtracting the value indicated by an FPS identifier from the value indicated by the AIF size of the AIF parameter 118. Put differently, the size of the extracted feature points (e.g., indicated by an FPS identifier) can be subtracted from the size of the AIF 116 (e.g., indicated by the AIF parameters 118 for the AIF 116). The result of the difference calculated above can be divided by the bandwidth indicated by the network condition measurement 112 in order to yield the dynamic AIF parameter 119. The dynamic AIF parameter 119 can be converted into a time unit (e.g., milliseconds) that matches a time unit for an offload time differential threshold (OTDT), such as one of the OTDTs 130, which will be discussed in greater detail below. It is understood that the dynamic AIF parameter 119 may be generated via execution of the AR controller 106 by the processor 103 after the AIF 116 has been received by the AR system 102. In some embodiments, the dynamic AIF parameter 119 may not necessarily be determined for every AIF of the AIF stream 114, but instead can be determined (a) periodically (e.g., every tenth AIF and/or after expiration of a reoccurring time period, such as after every five seconds).

The AR controller 106 can create a plurality of local feature extraction time estimates (LFETEs), such as the LFETEs 136A. In an embodiment, the LFETEs 136A can include the LFETE A 138A, the LFETE B 140A, and the LFETE N 142A. Each LFETE of the plurality of LFETEs 136A can indicate an amount of execution latency (e.g., measured in units to time, such as milliseconds) that would be experienced on the AR system 102 if a particular ARP instance were to be executed locally on the AR system (e.g., by the processor 103) in order to extract feature points (e.g., any of the feature points 151, the feature points 157, and/or the feature points 163) from the AIF 116. The LFETEs 136A can be determined based on a mapping that associates the feature point size that would be produced by a particular AR process instance with specifications of the processor 103 (e.g., clock speed, cache speed, etc.) executing the particular AR process instance on the AR system 102 and/or specification of the memory 110 (e.g., maximum transfer rate, amount of memory, etc.) storing the AR process instances 144 to yield an estimated local feature extraction time, such as one of the LFETEs 136A. Put differently, each LFETE can provide an estimate of the time to extract feature points from the AIF 116 by the AR system 102 executing a particular ARP instance. Each LFETE can be associated with one of the ARP instances, such as the LFETE A 138A corresponding with a time estimate to create the feature points 151 when the ARP instance A 146 is executed, the LFETE B 140A corresponding with a time estimate to create the feature points 157 when the ARP instance B 152 is executed, and the LFETE N 142A corresponding with a time estimate to create the feature points 163 when the ARP instance N 158 is executed. The total number of LFETEs 136A correlates with the total number of ARP instances 144 that could be used and/or otherwise implemented locally by the AR system 102. It is understood that the AR controller 106 can create the LFETEs based on technical specifications of the processor 103 and/or other computing hardware that is locally available on the AR system 102.

In some embodiments, the AR controller 106 can create cloud feature extraction time estimates (CFETEs) and/or receive CFETEs created by the AR cloud server 180, such as the CFETEs 136B. In an embodiment, the CFETEs 136B can include the CFETE A 138B, the CFETE B 140B, and the CFETE N 142B. Each CFETE of the plurality of CFETEs 136B can indicate an amount of execution latency (e.g., measured in units to time, such as milliseconds) that would be experienced by the AR cloud server 180 if the raw file 120 were to be executed on the AR cloud server 180 (e.g., by a processor 182 of the AR cloud server 180) in order to extract feature points (e.g., any of the feature points 151, the feature points 157, and/or the feature points 163) from the AIF 116 using a particular APR instance executing on the AR cloud server 180, and an amount of time for offloading the raw file 120 to the AR cloud server 180 and receiving augmented content from the AR system 102. The CFETEs 136B can be determined based on a mapping that associates the feature point size that would be produced by a particular AR process instance (e.g., the FPS A 150, the FPS B 156, or the FPS N 162 that would be produced by the ARP instances 144A since the ARP instances 144A can be copies of the ARP instances 144) with specifications of the processor 182 (e.g., clock speed, cache speed, etc.) executing the particular AR process instance (e.g., one of the ARP instances 144A that are substantially similar to the ARP instances 144 on the AR system 102) on the AR cloud server 180 and/or specification of the memory 184 (e.g., maximum transfer rate, amount of memory, etc.) storing the AR process instances 144A to yield an estimated cloud feature extraction time, such as one of the CFETEs 136B. Put differently, each CFETE can provide an estimate of the time that includes end-to-end latency (e.g., the time spent offloading the raw file 120 to the AR cloud server 180 and the time to receive augmented content, such as the augmented content 134, in a response message, such as the response message 194) and a time for the AR cloud server 180 to extract feature points from the raw file 120 of the AIF 116 by implementing (e.g., via execution of the processor 182 of the AR cloud server 180) a particular ARP instance. Each CFETE can be associated with one of the ARP instances 144A of the AR cloud server 180, where the ARP instances 144A can be copies, duplicates, or otherwise substantially similar to the ARP instances 144 of the AR system 102. For example, the CFETE A 138B can be a time estimate to create feature points when the ARP instance A 146A is executed by the AR cloud server 180 (where the feature point size created using the ARP instance A 146 can be substantially similar or identical as the FPS A 150 when the ARP instance A 146 of the AR system 102 is executed), the CFETE B 140B can correspond with a time estimate to create feature points when the ARP instance B 152A is executed by the AR cloud server 180, and the CFETE N 142B can correspond with a time estimate to create feature points when the ARP instance N 158A is executed by the AR cloud server 180. The total number of CFETEs 136B correlates with the total number of LFETEs 136A that are created by the AR system 102. It is understood that, in some embodiments, an AR cloud controller 185, can create the CFETEs 136B based on technical specifications of the processor 182 and/or other computing hardware that is available to the AR cloud server 180. In some embodiments, the AR system 102 can receive the CFETEs 136B from the AR cloud controller 185.

The AR system 102 can determine the plurality of OTDTs 130, where each of the OTDTs 130 can be associated with one of the ARP instances 144 (e.g., the OTDT 138C corresponding with the ARP instance A 146, the OTDT 140C corresponding with the ARP instance B 152, and the OTDT 142C corresponding with the ARP instance N 158). The AR controller 106 can determine an OTDT (e.g., any of the OTDTs 138C, 140C, and/or 142C) by determining the difference between one of the LFETEs 136A associated with a particular ARP instance that is executed by the AR system 102 to extract feature points and one of the corresponding CFETEs 136B for the same ARP instance. The difference that is determined will yield the offload time differential threshold (measured in units of time, such as milliseconds) for a particular ARP instance. For example, the AR controller 106 can create the OTDT 138C by subtracting the CFETE A 138B from the LFETE A 138A. The OTDT 138C can correspond with the ARP instance A 146. The OTDT 140C can be determined by the AR controller 106 subtracting the CFETE B 140B from the LFETE B 140A. The OTDT 140C can correspond with the ARP instance B 152. The OTDT 142C can be determined by the AR controller 106 subtracting the CFETE N 142B from the LFETE N 142A. The OTDT 142C can correspond with the ARP instance N 158. In some embodiments, the AR controller 106 can ensure that each of the plurality of OTDTs 130 are converted to a time unit that matches a time unit of the dynamic AIF parameter 119 (e.g., milliseconds).

The AR controller 106 can generate a plurality of offload commands 122 for augmenting the AIF 116 based on the plurality of OTDTs 130 and the dynamic AIF parameter 119. Examples of an offload command can include a command to offload the AIF 116 as a raw file, such as the raw file 120, to the AR cloud server 180, and a command to offload feature points extracted from the AIF 116 by the AR system 102 to the AR cloud server 180 by using a particular ARP instance (e.g., one of the ARP instance A 146, the ARP instance B 152, and/or the ARP instance N 158). In some embodiments, a single instance of an offload command (OC) can be associated with one of the plurality of ARP instances 144 (e.g., an OC A 124 can be associated with the ARP instance A 146, an OC B 126 can be associated with the ARP instance B 152, and an OC N 128 can be associated with the ARP instance N 158). The AR controller 106 can generate an offload command for a respective ARP instance by determining whether the dynamic AIF parameter 119 exceeds the OTDT for the respective ARP instance.

If the dynamic AIF parameter 119 exceeds the OTDT for the respective ARP instance, then the AR controller 106 can configure the offload command to instruct the AR system 102 to offload feature points that would be created by executing the respective ARP instance by the AR system 102 to extract feature points from the AIF 116. If the dynamic AIF parameter 119 does not exceed the OTDT for the respective ARP instance, then the AR controller 106 can configure the offload command to instruct the AR system 102 to offload the raw file 120 to the AR cloud server 180, and in some embodiments, also instruct the AR cloud controller 185 to perform an augmentation process 123, which will be described in further detail below.

For example, an instance of the dynamic AIF parameter 119 can be created by the AR controller 106 and compared to the OTDT 138C (which is associated with the ARP instance A 146). In this example, if the dynamic AIF parameter 119 is greater than the OTDT 138C, then the AR controller 106 can create the offload command A 124 associated with the ARP instance A 146 to instruct the AR system 102 to use the ARP instance A 146 to create the feature points 151 from the AIF 116 and then to offload the feature points 151 to the AR cloud server 180, such as by sending the feature points 151 in the offload message 192 via the communication path 1. However, in an alternate embodiment, if the dynamic AIF parameter 119 is not greater than the OTDT 138C, then the AR controller 106 can create the OC A 124 to instruct the AR system 102 to send (e.g., via the offload message 192) the raw file 120 to the AR cloud server 180.

The same operations can be performed by the AR controller 106 to create offload commands for each of the remaining ARP instances. For example, the AR controller 106 can determine whether the dynamic AIF parameter 119 is greater than the OTDT 140C in order to create the OC B 126 that can include a command to offload the feature points 157 or to offload the raw file 120 and can instruct the AR cloud controller 185 to use the ARP instance B 152 on the AR cloud server 180. Similarly, the AR controller 106 can determine whether the dynamic AIF parameter 119 is greater than the OTDT 142C in order to create the OC N 128 that can include a command to offload the feature points 163 or to offload the raw file 120 and can instruct the AR cloud controller 185 to use the ARP instance N 158 on the AR cloud server 180. Each offload command (e.g., the OC A 124, the OC B 126, and the OC N 128) can include the ARP identifier corresponding to the ARP instance (e.g., one of the ARP A ID 148, the ARP B ID 154, or the ARP N ID 160) that should be used to extract feature points. If the offload command indicates that feature points are to be offloaded to the AR cloud server 180, then the ARP identifier included in the offload command will be used by the AR system 102 to execute the corresponding ARP instance in order to extract the feature points from the raw file 120 of the AIF 116. Once extracted by the AR system 102, the feature points can be sent to the AR cloud server 180 for further augmentation processing, which will be discussed below. In some embodiments, if the offload command instructs the AR controller 106 to offload the raw file 120 to the AR cloud server 180, then the offload command also can instruct the AR cloud controller 185 to use a particular ARP instance when performing augmentation to the raw file 120 of the AIF 116 (e.g., by including an ARP identifier that the AR cloud controller 185 can use to call one of ARP instances 144A that resides on the AR cloud server 180).

Once the plurality of offload commands 122 are generated by the AR controller 106, the AR controller 106 can determine which of the plurality of offload commands 122 for the AIF 116 should be activated. In some embodiments, only one offload command (e.g., one of the OC A 124, the OC B 126, or the OC N 128) may be activated from among the plurality of offload commands 122. To "activate" one of the offload commands, the AR controller 106 may select one of the offload commands (e.g., one of the OC A 124, the OC B 126, or the OC N 128), and then implement the offload command via execution by the processor 103. In some embodiments, selection of one of the offload commands 122 can be based on a determination of which of the offload commands 122 corresponds with the least amount of processing time. In some embodiments, selection and activation of one of the offload commands 122 can be based an amount of energy that is consumed by one of the ARP instances 144 relative to an energy consumption threshold 198. For example, in an embodiment, the AR controller 106 can receive at least one energy consumption threshold 198 from the AR cloud server 180. In some embodiments, the AR system 102 can determine a plurality of local energy consumption estimates (LECEs) 121A that include estimates for an amount of energy consumed (e.g., in milliamp hours)

when a particular AR process instance is executed to extracted and/or create feature points from the AIF 116. A local energy consumption estimate can correspond with one of the ARP instances, such as the LECE A 125A corresponding with the ARP instance A 146, the LECE B 127A corresponding with the ARP instance B, and the LECE N 129A corresponding with the ARP instance N 158. The energy consumption threshold 198 can include an energy value that represents the difference between an amount of energy that would be consumed to extract feature points using any of the ARP instances 144 on the AR system 102 (i.e., one of the LECEs 121A) and an amount of energy that would be consumed by the AR cloud server 180 implementing the same ARP instance (e.g., one of the ARP instances 144A that corresponds with one of the ARP instances 144). In some embodiments, the AR controller 106 can compare the energy consumption threshold 198 with a dynamic energy consumption parameter 196. The dynamic energy consumption parameter 196 can be determined by the AR controller 106 first subtracting a size of one of the feature points for an ARP instance (e.g., any of the FPS A 150, FPS identifier B 156, or the FPS N 162) from the AIF size indicated in the AIF parameters 118 for the AIF 116. The difference that is determined can then be multiplied by an amount of energy consumed per bit processed by the processor 103 in order to yield the dynamic energy consumption parameter 196 for a particular one of the ARP instances 144. In some embodiments, if an offload command instructs the AR controller 106 to offload feature points to the AR cloud server 180, then the AR controller 106 may decide to allow the particular offload command to be activated only if the dynamic energy consumption parameter 196 is greater than the energy consumption threshold 198. In some embodiments, if the dynamic energy consumption parameter 196 is not greater than the energy consumption threshold 198, then the AR controller 106 may not allow activation of one or more offload commands that instruct the AR controller 106 to offload feature points. Instead, in an embodiment, the AR controller 106 may send the raw file 120 of the AIF 116 to the AR cloud server 180. It is understood that the examples discussed are for illustration purposes only, and therefore should not be construed as limiting in any way.

In an embodiment, if the offload command (i.e., one of the OC A 124, the OC B 126, or the OC N 128) that is activated includes a command to offload feature points to the AR cloud server 180, then the AR controller 106 can execute the ARP instance indicated by the ARP identifier in the offload command (e.g., executing the ARP instance A 146 if the ARP A ID 148 is indicated, executing the ARP instance B 152 if the ARP B ID 154 is indicated, or executing the ARP instance N 158 if the ARP N ID 160 is indicated). When one of the ARP instances 144 is executed by the AR system 102 in response to activation of an offload command, the ARP instance indicated by the offload command can extract feature points (e.g., the feature points 151, 157, 163) from the raw file 120 of the AIF 116. The feature points (e.g., the feature points 151, 157, or 163) can be included in an offload message, such as the offload message 192. The offload message 192 can include one of the offload commands 122 and an ARP instance identifier to instruct the AR cloud controller 185 of the ARP instance that should be used to facilitate augmentation. In an embodiment, the offload message 192 can include the feature points (e.g., the feature points 151, 157, or 163) that were extracted by the AR system 102 based on an offload command to offload feature points to the AR cloud server 180. In other embodiments, the offload message 192 can include the raw file 120 of the AIF 116 based on an offload command to offload the raw file 120 to the AR cloud server 180. Thus, the offload command being activated (e.g., one of the OC A 124, the OC B 126, or the OC N 128) can be unique to a particular AIF 116 of the AIF stream 114. This can allow a different ARP instance to be used for separate AIFs in the AIF stream 114. In some embodiments, the AR controller 106 may not create an offload command and send the offload message 192 for every AIF in the same AIF stream 114, but instead may send the offload message 192 after a time period has elapsed (e.g., after passage of X number of seconds).

The offload message 192 can be sent by the AR controller 106 to the AR cloud controller 185 via the communication path 1. When the offload message 192 is received by the AR cloud controller 185, the AR cloud controller 185 can determine whether feature points (e.g., the feature points 151, 157, or 163) are included and/or whether the raw file 120 is included. In some embodiments, if the raw file 120 is included in the offload message 192, then the AR cloud controller 185 can use the ARP identifier that is also included in the offload message 192 to activate a corresponding one of the ARP instances 144a (which can be substantially similar and/or copies of the ARP instances 144 on the AR system 102) for execution in an augmentation process stored in a memory 184 of the AR cloud server 180, such as the augmentation process 123.

The augmentation process 123 can include object detection 186 to detect objects and find regions of interest within the raw file 120. The augmentation process 123 also can include feature extraction 188, where one of the ARP instances 144A can be used to extract feature points from the raw file 120 (e.g., one of the ARP instances 144A indicated by an ARP identifier included in the offload message 192). In some embodiments, the feature extraction can extract feature points from the regions of interest detected during the object detection 186. From the operation of feature extraction 188, the augmentation process 123 can also include object recognition 190. In some embodiments, the feature points that were extracted can be provided by the AR cloud controller 185 executing one of the ARP instances 144A as discussed above in the feature extraction 188. In other embodiments, the feature points (e.g., the feature points 151, 157, or 163) may have been included in the offload message 192 based on one of the offload commands 122 instructing the AR controller 106 to offload feature points (e.g., the feature points 151, 157, or 163). In these embodiments, the AR cloud controller 185 can instruct one of the ARP instances 144A to bypass the object detection 186 and the feature extraction 188, and instead proceed to the object recognition 190, such as indicated by the process flow line 145.

The augmentation process 123 can use the feature points (whether extracted via the feature extraction 188 by the AR cloud controller 185 implementing one of the ARP instances 144A or via one of the feature points 151, 157, or 163 being included in the offload message 192) to perform the object recognition 190. In some embodiments, the object recognition 190 can include the AR cloud controller 185 using the feature points of the AIF 116 (from either the feature extraction 188 or received via the offload message 192) to identify target objects within an image stored in an object recognition datastore 176 of the network 174. As used herein, the phrase "data store" refers to a data storage device such as a database, a data server, a mass data storage device, or the like. In the embodiment shown in FIG. 1, the functionality of the object recognition datastore 176 can be provided by one or more databases, data storage device, server computers, desktop computers, mobile telephones, laptop computers, other computing systems, and the like. For purposes of illustrating and describing the various embodiments of the concepts and technologies described herein, the object recognition datastore 176 is illustrated and described herein as being hosted by a server computer that is located remote from the AR system 102. It should be understood that this example is illustrative and therefore should not be construed as being limiting in any way.

If one or more target objects are recognized within an image from the object recognition datastore 176, then the AR cloud controller 185 can obtain the image from the object recognition datastore 176 and proceed to template matching 193. In some embodiments, the template matching 193 can include the AR cloud controller 185 verifying that the target object received from the object recognition datastore 176 matches the object 170 captured by the AIF 116. In some embodiments, the template matching 193 also can include determining a pose (i.e., a position of the object 170 captured by the AIF 116). The pose of the object identified by the object recognition 190 can be used as input for object tracking. In some embodiments, the AR cloud controller 185 can send an object tracker (not shown) to the AR controller 106 so that the AR controller 106 can avoid object recognition for every frame of the AIF stream 114.

In some embodiments, the AR cloud controller 185 can determine augmented content, such as the augmented content 134, associated with the object identified in the image from the object recognition datastore 176. In some embodiments, the AR cloud controller 185 can create the augmented content 134. The augmented content 134 can include information that is associated with the object 170 that was captured within the AIF 116. For example, as illustrated in FIG. 1, the AIF 116 can include an image of the object 170, which is shown as a housing structure. In some embodiments, the augmented content 134 can provide information associated with the object 170 and the augmented content 134 can be configured to be overlaid on top of the AIF 116 while being presented to the user 164. The AR cloud controller 185 can send the augmented content 134 and the object tracker to the AR controller 106 in a response message, such as the response message 194. Once the AR cloud server 180 has performed the augmentation process 123 based on the AR system 102 implementing one of the offload commands 122, the AR cloud server 180 can return the augmented content 134 to the AR system 102 for presentation to the user 164 via the display 107. In some embodiments, the AR controller 106 can receive the response message 194 that can include the augmented content 134 and/or the object tracker. The AR controller 106 can render the augmented content 134 in order to overlay the information from the augmented content 134 onto the display 107 that can present the AIF stream 114.

FIG. 1 illustrates one AR system 102, one object 170, one user 164, one communication path 1, one access point 172, one network 174, one object recognition datastore 176, and one AR cloud server 180. It should be understood, however, that various implementations of the operating environment 100 can include zero, one, or more than one AR system 102; zero, one, or more than one object 170; zero, one, or more than one user 164; zero, one, or more than one communication path 1; zero, one, or more than one access point 172; zero, one, or more than one network 174; zero, one, or more than one object recognition datastore 176; and zero, one, or more than one AR cloud server 180. As such, the illustrated embodiment should be understood as being illustrative, and should not be construed as being limiting in any way.

Figure 2:
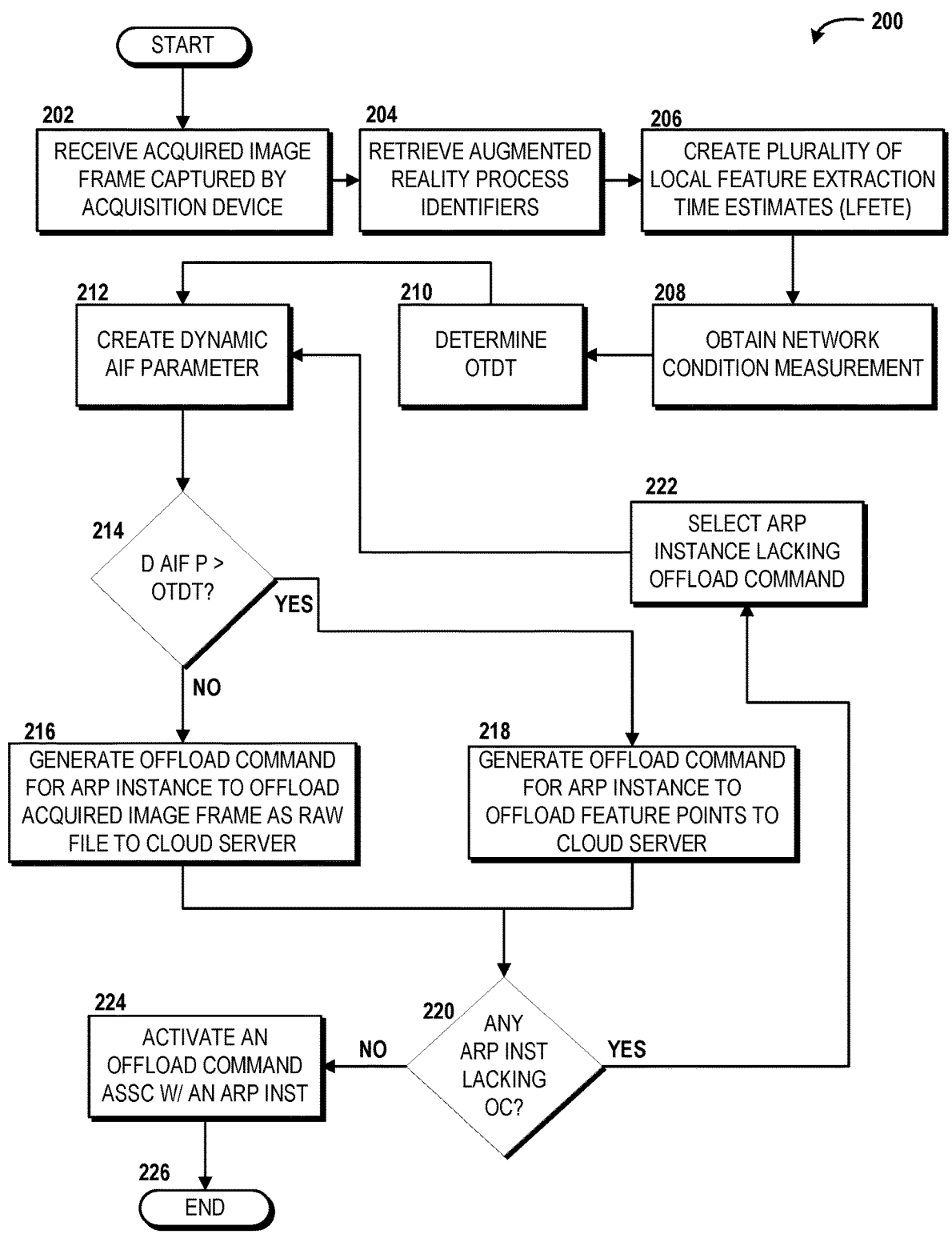
FIG. 2 is a flow diagram showing aspects of a method for providing cloud offloading to facilitate mobile augmented reality, according to an illustrative embodiment of the concepts and technologies described herein.

Turning now to FIG. 2, aspects of a method 200 for adaptive cloud offloading of mobile augmented reality will be described in detail, according to an illustrative embodiment. It should be understood that the operations of the method disclosed herein (e.g., the method 200) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, AR computer systems, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the AR system 102 and/or the AR cloud server 180, to perform one or more operations and/or causing the processor to direct other components of the computing system or device to perform one or more of the operations.

For purposes of illustrating and describing the concepts of the present disclosure, the methods disclosed herein are described as being performed by the AR system 102 via execution of one or more software modules such as, for example, the AR controller 106 that configure one or more processors. It should be understood that additional and/or alternative devices and/or network nodes can, in some embodiments, provide the functionality described herein via execution of one or more modules, applications, and/or other software including, but not limited to, the AR cloud server 180 executing the AR cloud controller 185. Thus, the illustrated embodiments are illustrative, and should not be viewed as being limiting in any way.

The method 200 begins at operation 202. At operation 202, the AR system 102 executing the AR controller 106 can receive an acquired image frame (AIF), such as the AIF 116, captured by an acquisition device, such as the acquisition device 108. The AIF 116 can indicate a plurality of AIF parameters 118, such as an AIF size that provides a size of the AIF 116 (e.g., measured in KB) and an identifier that corresponds with the AR application 166. In some embodiments, the AIF 116 can be received as part of an AIF stream, such as the AIF stream 114. From operation 202, the method 200 can proceed to operation 204 where the AR controller 106 can retrieve augmented reality process (ARP) identifiers corresponding to a plurality of ARP instances, such as the ARP A ID 148 corresponding to the ARP instance A 146, the ARP B ID 154 corresponding to the ARP instance B 152, and the ARP N ID 160 corresponding to the ARP instance N 158. In some embodiments, the total number of ARP identifiers that are retrieved can vary based on the total number of ARP instances available for use by the AR controller 106 and/or the AR application 166. It should be understood that this example is illustrative and therefore should not be construed as being limiting in any way.

From operation 204, the method 200 proceeds to operation 206, where the AR controller 106 can create a plurality of local feature extraction time estimates (LFETEs) 136A based on the plurality of AIF parameters 118. For example, the AR controller 106 can determine the length of time that would likely be required for each of the ARP instances 144 to extract feature points (e.g., the feature points 151, 157, and/or 163) using the processor 103 of the AR system 102. Features points can be generated from the AIF 116 via implementing (i.e., executing) an ARP instance associated with one of the ARP identifiers. The AR controller 106 can create one LFETE for each ARP instance, such as the LFETE A 138A corresponding with the ARP instance A 146, the LFETE B 140A corresponding with the ARP instance B 152, and the LFETE N 142A corresponding with the ARP instance N 158. In some embodiments, each of the LFETEs 136A can have time units measured in milliseconds. It should be understood that the example above is illustrative and therefore should not be construed as being limiting in any way.

From operation 206, the method 200 proceeds to operation 208, where the AR controller 106 can obtain a network condition measurement, such as the network condition measurement 112. In some embodiments, the network condition measurement can include a metric or value that corresponds with an average bandwidth and/or throughput that the AR system 102 has and/or will experience in sending and/or receiving communications along the communication path 1 to and/or from the AR cloud server 180 of the network 174. In some embodiments, the network condition measurement can have units measured in bits per second (e.g., megabits per second, kilobits per second, etc.).

From operation 208, the method 200 can proceed to operation 210, where the AR controller 106 can determine one or more offload time differential thresholds (OTDTs), such as the OTDTs 130. Each of the OTDTs 130 can be associated with one of the ARP instances 144 (e.g., the OTDT 138C corresponding with the ARP instance A 146, the OTDT 140C corresponding with the ARP instance B 152, and the OTDT 142C corresponding with the ARP instance N 158). The AR controller 106 can determine the OTDTs 130 based on a time indicated by each of the LFETEs 136A and cloud feature extraction time estimates (CFETEs), such as the CFETEs 136B that can be provided to the AR controller 106 from the AR cloud controller 185. The CFETEs 136B can provide an estimate for an amount of time that would be required if one of the ARP instances 144A (which can be copies of the ARP instances 144 of the AR system 102) were to be implemented on the AR cloud server 180 (e.g., the AR cloud controller 185 executing one of the ARP instances 144A via the processor 182) to generate feature points associated with the AIF 116. The CFETEs 136B can also be measured in units of time (e.g., milliseconds). Each of the CFETEs 136B can indicate a different amount of time than the LFETEs 136A because, for example, the amount of processing power and capacity may differ between the processor 103 of the AR system 102 and the processor 182 of the AR cloud server 180. The AR controller 106 can subtract each CFETE from a corresponding LFETE (e.g., the CFETE A 138B subtracted from the LFETE A 138A, etc.).

From operation 210, the method 200 proceeds to operation 212, where the AR controller 106 can create a dynamic AIF parameter, such as the dynamic AIF parameter 119. In some embodiments, the dynamic AIF parameter 119 can be created for a particular ARP instance. The dynamic AIF parameter 119 can be based on the feature point size of a particular ARP instance (e.g., the FPS identifier A 150, the FPS identifier B 156, and/or the FPS identifier N 162), the AIF size indicated in the AIF parameters 118, and the network condition measurement 112 (e.g., the average bandwidth available to the AR system 102). In some embodiments, the dynamic AIF parameter 119 can be determined by the AR cloud controller 185 finding the difference between the feature point size and the AIF size, and then dividing that result by the network condition measurement 112. The dynamic AIF parameter 119 can yield a value measured in units of time (e.g., milliseconds) and can be compared with a respective one of the OTDTs 130.

From operation 212, the method 200 can proceed to operation 214, where the AR controller 106 can determine whether the dynamic AIF parameter 119 is greater than a respective one of the OTDTs 130. For example, if the dynamic AIF parameter 119 is created based on the AIF size of the AIF parameters 118, the feature point size A 150, and the network condition measurement 112, then the AR controller 106 can compare the dynamic AIF parameter 119 with the OTDT 138C that is associated with the ARP instance A 146. If the dynamic AIF parameter 119 is greater than the OTDT 138C, then the AR controller 106 can generate an offload command and proceed to operation 218. If the dynamic AIF parameter 119 is not greater than the OTDT 138C, then the AR controller 106 can generate a different offload command and proceed to operation 216. Therefore, the offload command that is generated can be based on the network condition measurement 112, the dynamic AIF parameter 119, one of the LFETEs 136A, one of the CFETEs 136B, and/or a combination thereof. As illustrated in FIG. 2, the AR controller 106 can generate an offload command for each ARP instance and in some embodiments may do so in an iterative manner. It is understood that alternate embodiments can include the AR controller 106 generating a plurality of offload commands in series, parallel, and/or a combination thereof, such as by using multi-thread processing on the processor 103. Each one of the offload command 122 can include one of a command to offload the raw file 120 to a cloud server, such as the AR cloud server 180, or a command to offload, to the AR cloud server 180, feature points (e.g., the feature points 151, 157, or 163) that can be extracted from the AIF 116 by executing one of the ARP instances 144. For clarity purposes, operation 216 will be discussed first, followed by a discussion of operation 218.

If the dynamic AIF parameter 119 is not greater than a respective OTDT (e.g., one of the OTDTs 138C, 140C, and 142C), then from operation 214, the method 200 can proceed along the NO path to operation 216, where the AR controller 106 can generate an offload command that includes a command to offload the AIF 116 as a raw file, such as the raw file 120. The AIF 116 can include the raw file 120, which corresponds with image data that has not been created by the AR controller 106, but rather captured by the acquisition device 108. Thus, the AR controller 106 can offload the AIF 116 as a raw file by sending the raw file 120 as it was received from the acquisition device 108. In some embodiments, the AR controller 106 can include the ARP identifier corresponding to the ARP instance that the offload command pertains (e.g., including the ARP A ID 148 if the offload command pertains to the ARP instance A 146). The offload command can instruct the AR cloud controller 185 to use the ARP identifier included in the offload message (e.g., the offload message 192 in an embodiment) in order for the AR cloud controller 185 to implement or otherwise execute a corresponding one of the ARP instances 144A and facilitate the augmentation process 123.

Returning to operation 214, if the dynamic AIF parameter 119 is greater than a respective OTDT (e.g., one of the OTDTs 138C, 140C, and 142C), then from operation 214, the method 200 can proceed along the YES path to operation 218, where the AR controller 106 can generate an offload command that instructs the AR controller 106 to execute a respective one of the ARP instances 144 to extract or otherwise generate feature points from the raw file 120 of the AIF 116, and send the feature points to the AR cloud server 180. For example, if the dynamic AIF parameter 119 was created based on the feature point size from ARP instance A 146 (i.e., using the FPS A 150), then when the dynamic AIF parameter 119 is greater than the OTDT 138C (which correspond with the ARP instance A 146), then the offload command A 124 can be generated. In this example, the offload command A 124 can include an instruction for the AR controller 106 to use the processor 103 to execute the ARP instance A 146 in order to extract or otherwise generate the feature points 151 from the raw file 120 of the AIF 116. In some embodiments, the offload command to offload feature points to the AR cloud server 180 can include an instruction to send the feature points corresponding to an ARP instance (e.g., in the example above, the feature points 151 corresponding to the ARP instance A 146) in an offload message, such as the offload message 192. In some embodiments, the offload command (e.g., any of the OC A 124, the OC B 126, or the OC N 128) can include the dynamic AIF parameter 119 or the respective OTDT in order to indicate the amount of time that would be required for execution and/or implementation of the particular offload command, should that offload command be activated, as will be discussed below with respect to operation 224.

From either operation 216 or 218, the method 200 can proceed to operation 220, where the AR controller 106 can determine whether any of the ARP instances 144 lack an offload command. This can be accomplished by the AR controller 106 verifying that each offload command that has been created includes an ARP instance identifier corresponding to one of the ARP instances 144. If the number of ARP instances 144 outnumber the amount of offload commands 122, then the AR controller 106 determines that at least one of the ARP instances lacks an offload command. In some embodiments, the method 200 can proceed along the YES path from operation 220 to operation 222, where the AR controller 106 can identify and select an ARP instance that lacks an offload command. For example, the AR controller 106 can identity which ARP instance identifiers (e.g., any of the ARP A ID 148, the ARP B ID 154, or the ARP N ID 160) are not included in the offload commands that have already been created. The AR controller 106 can select one of the ARP instances 144 that does not have an offload command associated with it, and use the FPS size (e.g., the FPS identifier A 150, the FPS identifier B 156, or the FPS identifier N 162) to (re)create the dynamic AIF parameters 119. From operation 222, the method 200 can proceed back to operation 212, which is discussed above. When operation 212 is preceded by operation 222, the AR controller 106 can use the feature point size corresponding to the ARP instance that was selected, such as by reference to the ARP identifier included in the selection of the ARP instance. Thus, in some embodiments, the dynamic AIF parameter 119 can be (re) created based on the feature point size for one of the ARP instances in order to allow for an offload command to be created with a specific association with that ARP instance.

Returning to operation 220, the AR controller 106 can confirm that all offload commands have been created, and none are lacking, when each offload command has been created for each of the plurality of ARP instances 144 (e.g., one of the offload commands 122 generated in operation 216 or 218 corresponds with one of the ARP instances 144). If none of the ARP instances lack an offload command, then the method 200 can proceed along the NO path to operation 224. At operation 224, the AR controller 106 can activate one of the plurality of offload commands 122 for the AIF 116. Each of the offload commands 122 corresponds with a particular one of the ARP instances 144. In some embodiments, the AR controller 106 can activate a particular one of the offload commands 122 based on, for example, the offload command that will provide the fastest processing time to extract feature points. In some embodiments, the offload command that is activated may correspond with the ARP instance that utilizes the least amount of energy, such as indicated by the dynamic energy consumption parameter 196. This can allow the AR controller 106 to activate different ARP instances for separate AIFs within the AIF stream 114.

From operation 224, the method 200 proceeds to operation 226, where the method 200 ends.

Figure 3:
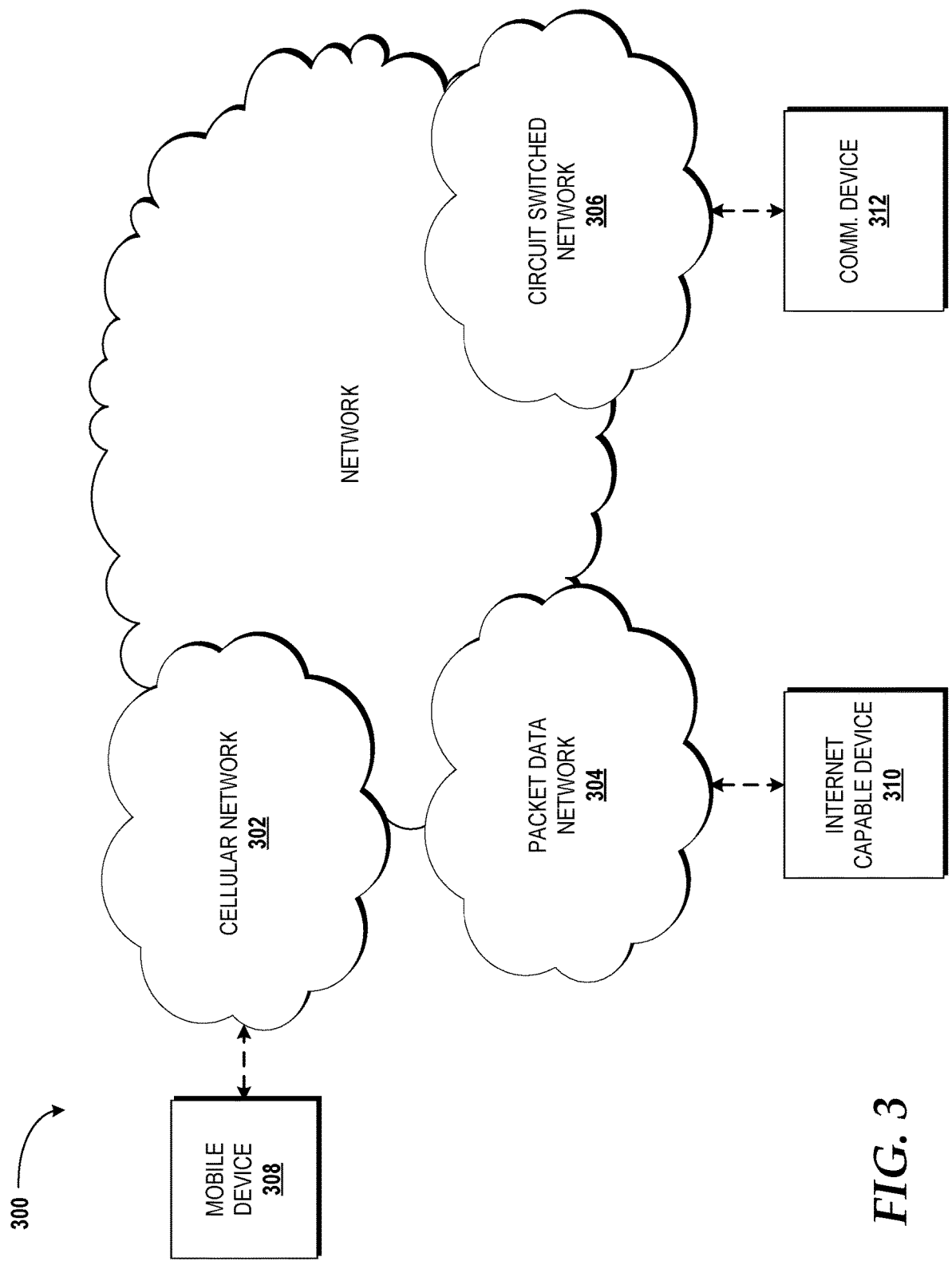
FIG. 3 is a block diagram illustrating an example network capable of implementing aspects of the concepts and technologies described herein.

Turning now to FIG. 3, details of a network 300 are illustrated, according to an illustrative embodiment. In some embodiments, the network 300 can include the network 174. The network 300 includes a cellular network 302, a packet data network 304, for example, the Internet, and a circuit switched network 306, for example, a PSTN. The cellular network 302 includes various network components such as, but not limited to, base transceiver stations ("BTSs"), NBs or eNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 302 also includes radios and nodes for receiving and transmitting voice, data, and combinations thereof to and from radio transceivers, networks, the packet data network 304, and the circuit switched network 306.

A mobile communications device 308, such as, for example, a cellular telephone, a user equipment, a mobile terminal, a PDA, a laptop computer, a handheld computer, and combinations thereof, can be operatively connected to the cellular network 302. In some embodiments, the AR system 102 can be configured as the mobile communication device 308. The cellular network 302 can be configured as a 2G GSM network and can provide data communications via GPRS and/or EDGE. Additionally, or alternatively, the cellular network 302 can be configured as a 3G UMTS network and can provide data communications via the HSPA protocol family, for example, HSDPA, EUL (also referred to as HSUPA), and HSPA+. The cellular network 302 also is compatible with 4G mobile communications standards such as LTE, or the like, as well as evolved and future mobile standards, such as LTE-U.

The packet data network 304 includes various devices, for example, servers, computers, databases, and other devices in communication with one another, as is generally known. The packet data network 304 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 304 includes or is in communication with the Internet. In some embodiments, the network 174 can be configured as a packet data network, such as the packet data network 304. The circuit switched network 306 includes various hardware and software for providing circuit switched communications. The circuit switched network 306 may include, or may be, what is often referred to as a POTS. In some embodiments, the network 174 also can be configured as a circuit switched network, such as the circuit switched network 306. The functionality of a circuit switched network 306 or other circuit-switched network are generally known and will not be described herein in detail.

The illustrated cellular network 302 is shown in communication with the packet data network 304 and a circuit switched network 306, though it should be appreciated that this is not necessarily the case. One or more Internet-capable devices 310, for example, a PC, a laptop, a portable device, or another suitable device, can communicate with one or more cellular networks 302, and devices connected thereto, through the packet data network 304. It also should be appreciated that the Internet-capable device 310 can communicate with the packet data network 304 through the circuit switched network 306, the cellular network 302, and/or via other networks (not illustrated).

As illustrated, a communications device 312, for example, a telephone, facsimile machine, modem, computer, or the like, can be in communication with the circuit switched network 306, and therethrough to the packet data network 304 and/or the cellular network 302. It should be appreciated that the communications device 312 can be an Internet-capable device, and can be substantially similar to the Internet-capable device 310. In the specification, the network of FIG. 3 is used to refer broadly to any combination of the networks 302, 304, 306 shown in FIG. 3. It should be appreciated that, in some embodiments, substantially all of the functionality described with reference to the network 174 can be performed by the cellular network 302, the packet data network 304, and/or the circuit switched network 306, alone or in combination with other networks, network elements, and the like, according at least to aspects of the features and operations discussed herein.

Figure 4:
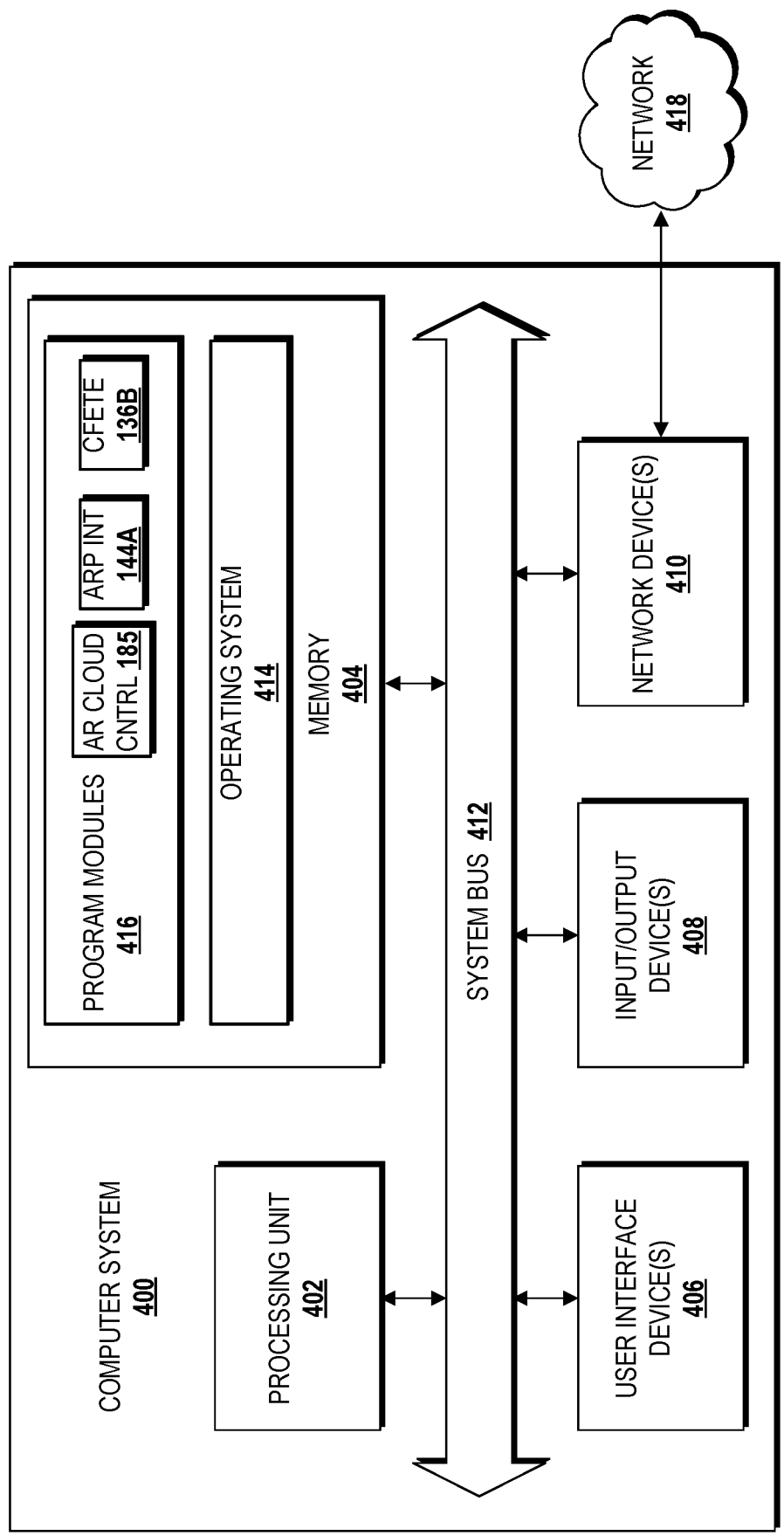
FIG. 4 is a block diagram illustrating an example computer system configured to provide, implement, and execute operations associated with cloud offloading for mobile augmented reality, according to some illustrative embodiments of the concepts and technologies described herein.

Turning now to FIG. 4 is a block diagram illustrating a computer system 400 configured to provide the functionality in accordance with various embodiments of the concepts and technologies disclosed herein. The systems, devices, and other components disclosed herein can utilize, at least in part, an architecture that is the same as or at least similar to the architecture of the computer system 400. In some embodiments, one or more of the AR system 102, the access point 172, the AR cloud server 180, and/or the object recognition datastore 176 can be configured like the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. In some embodiments, for example, the program modules 416 can include the AR cloud controller 185, the augmentation process 123, the ARP instances 144A, and/or other program modules. These and/or other programs can be embodied in computer-readable media containing instructions that, when executed by the processing unit 402, in some embodiments, may perform and/or facilitate performance of one or more of the method 200 described in detail above with respect to FIG. 2. According to some embodiments, the program modules 416 may be embodied in hardware, software, firmware, or any combination thereof. Although not shown in FIG. 4, it should be understood that the memory 404 also can be configured to store the object recognition datastore 176, an energy consumption threshold 198, the cloud feature extraction time estimates 136B, and/or other data, if desired.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418, such as the network 174). Examples of the network devices 410 include, but are not limited to, a modem, a radio frequency ("RF") or infrared ("IR") transceiver, a telephonic interface, a bridge, a router, or a network card. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 418 may be or may include a wired network such as, but not limited to, a Wide Area Network ("WAN"), a wired Personal Area Network ("PAN"), a wired Metropolitan Area Network ("MAN"), a VoIP network, an IP/MPLS network, a PSTN network, an IMS network, an EPC network, or any other mobile network and/or wireline network.

Figure 5:
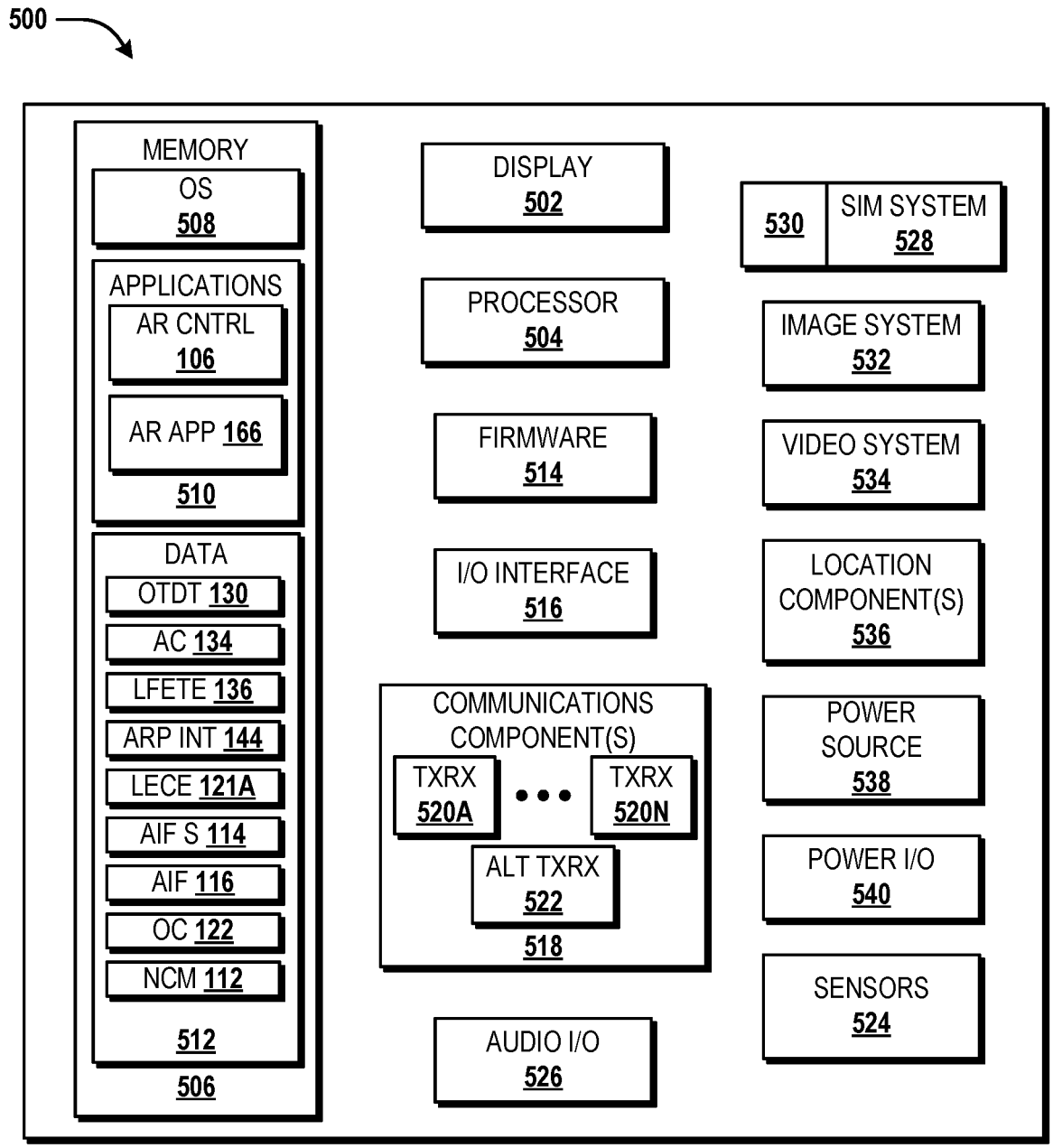
FIG. 5 is a block diagram illustrating an example mobile device capable of implementing aspects of the augmented reality system according to embodiments of the concepts and technologies described herein.

Turning now to FIG. 5, an illustrative mobile device 500 and components thereof will be described. In some embodiments, one or more of the AR system 102 (shown in FIG. 1) can be configured like the mobile device 500. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, launching the AR application 166, capturing the object 170 via the acquisition device 108, viewing the augmented content 134, entering/deleting data, entering and setting local credentials (e.g., user IDs and passwords) for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500. The data 512 can include, for example, one or more identifiers, and/or other applications or program modules. In some embodiments, the data 512 can include one or more of the offload time differential thresholds 130, the augmented content 134, the local feature extraction time estimates 136A, the ARP instances 144, the local energy consumption estimates 121A, the AIF stream 114, the AIF 116, the offload commands 122, the network condition measurement 112, the dynamic energy consumption parameter 196, the dynamic AIF parameter 119, the energy consumption thresholds 198, the cloud feature extraction time estimates 136B, or other data sent among and/or between the AR system 102 and the AR cloud server 180. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. In some embodiments, the applications 510 can include the AR controller 106 and the AR application 166 to facilitate mobile augmented reality. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RHO port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 620A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Based on the foregoing, it should be appreciated that concepts and technologies directed to adaptive cloud offloading of mobile augmented reality have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. An augmented reality system comprising:
a processor; and
a memory that stores computer-executable instructions that, in response to execution by the processor, cause the processor to perform operations comprising:
receiving an acquired image frame captured by an acquisition device, wherein the acquired image frame indicates a plurality of acquired image frame parameters, wherein the acquired image frame is received as a part of an acquired image frame stream,
identifying a plurality of augmented reality process instances that could be executed so as to provide feature point extraction for the acquired image frame, wherein the plurality of augmented reality process instances correspond to different process modules that can be executed locally on the augmented reality system or that can be executed remotely via an augmented reality cloud server to provide the feature point extraction for the acquired image frame,
prior to implementing at least one augmented reality process instance of the plurality of augmented reality process instances on either the augmented reality system or the augmented reality cloud server, determining a plurality of local feature extraction time estimates for the plurality of augmented reality process instances based on the plurality of acquired image frame parameters, wherein a respective local feature extraction time estimate is determined for each of the plurality of augmented reality process instances, wherein each of the plurality of local feature extraction time estimates provides an estimated amount of time to extract feature points from the acquired image frame in response to a respective augmented reality process instance being locally executed on the augmented reality system,
obtaining a network condition measurement,
generating a plurality of offload commands such that an offload command is generated for each of the plurality of augmented reality process instances that could be used to extract the feature points from the acquired image frame, wherein generating each of the plurality of offload commands is based on the network condition measurement and at least one of the plurality of local feature extraction time estimates, and selecting one offload command from the plurality of offload commands so as to activate a respective augmented reality process instance.

2. The augmented reality system of claim 1, wherein generating the plurality of offload commands is based on determining whether a dynamic acquired image frame parameter associated with the acquired image frame exceeds an offload time differential threshold for each of the plurality of augmented reality process instances, wherein determining the plurality of augmented reality process instances comprises retrieving augmented reality process identifiers corresponding to the plurality of augmented reality process instances, and wherein the offload command instructs an augmented reality cloud controller to use an augmented reality process identifier to execute a corresponding augmented reality process instance from among the plurality of augmented reality process instances.

3. The augmented reality system of claim 2, wherein each offload command is associated with a respective one of the plurality of augmented reality process instances.

4. The augmented reality system of claim 3, wherein each offload command includes one of a command to offload the acquired image frame as a raw file to a cloud server, or a command to offload the feature points from the acquired image frame to the cloud server.

5. The augmented reality system of claim 4, wherein the command to offload the feature points from the acquired image frame to the cloud server is based on determining that the dynamic acquired image frame parameter exceeds the offload time differential threshold corresponding to one of the plurality of augmented reality process instances.

6. The augmented reality system of claim 4, wherein the feature points are generated from the acquired image frame via implementing an augmented reality process instance of the plurality of augmented reality process instances associated with one of the augmented reality process identifiers.

7. The augmented reality system of claim 2, wherein the operations further comprise activating one of the plurality of offload commands for the acquired image frame.

8. A method comprising:

receiving, by an augmented reality system, an acquired image frame captured by an acquisition device, wherein the acquired image frame indicates a plurality of acquired image frame parameters, wherein the acquired image frame is received as a part of an acquired image frame stream;

identifying, by the augmented reality system, a plurality of augmented reality process instances that could be executed so as to provide feature point extraction for the acquired image frame, wherein the plurality of augmented reality process instances correspond to different process modules that can be executed locally on the augmented reality system or that can be executed remotely via an augmented reality cloud server to provide the feature point extraction for the acquired image frame;

prior to implementing at least one augmented reality process instance of the plurality of augmented reality process instances on either the augmented reality system or the augmented reality cloud server, determining, by the augmented reality system, a plurality of local feature extraction time estimates for the plurality of augmented reality process instances based on the plurality of acquired image frame parameters, wherein a local feature extraction time estimate is determined for each of the plurality of augmented reality process instances, wherein each of the plurality of local feature extraction time estimates provides an estimated amount of time to extract feature points from the acquired image frame in response to a respective augmented reality process instance being locally executed on the augmented reality system;

obtaining, by the augmented reality system, a network condition measurement;

generating, by the augmented reality system, a plurality of offload commands such that an offload command is generated for each of the plurality of augmented reality process instances that could be used to extract the feature points from the acquired image frame, wherein generating each of the plurality of offload commands is based on the network condition measurement and at least one of the plurality of local feature extraction time estimates; and selecting, by the augmented reality system, one offload command from the plurality of offload commands so as to activate a respective augmented reality process instance.

9. The method of claim 8, wherein generating the plurality of offload commands is based on determining whether a dynamic acquired image frame parameter associated with the acquired image frame exceeds an offload time differential threshold for each of the plurality of augmented reality process instances, wherein determining the plurality of augmented reality process instances comprises retrieving augmented reality process identifiers corresponding to the plurality of augmented reality process instances, and wherein the offload command instructs an augmented reality cloud controller to use an augmented reality process identifier to execute a corresponding augmented reality process instance from among the plurality of augmented reality process instances.

10. The method of claim 9, wherein each offload command is associated with a respective one of the plurality of augmented reality process instances.

11. The method of claim 10, wherein each offload command includes one of a command to offload the acquired image frame as a raw file to a cloud server, or a command to offload the feature points from the acquired image frame to the cloud server.

12. The method of claim 11, wherein the command to offload the feature points from the acquired image frame to the cloud server is based on determining that the dynamic acquired image frame parameter exceeds the offload time differential threshold corresponding to one of the plurality of augmented reality process instances.

13. The method of claim 12, wherein the feature points are generated from the acquired image frame via implementing an augmented reality process instance associated with one of the augmented reality process identifiers.

14. The method of claim 9, further comprising activating, by the augmented reality system, one of the plurality of offload commands for the acquired image frame.

15. A computer storage medium having computer-executable instructions stored thereon that, in response to execution by a processor, cause the processor to perform operations comprising:

receiving an acquired image frame captured by an acquisition device, wherein the acquired image frame indicates a plurality of acquired image frame parameters, wherein the acquired image frame is received as a part of an acquired image frame stream;
identifying a plurality of augmented reality process instances that could be executed so as to provide feature point extraction for the acquired image frame, wherein the plurality of augmented reality process instances correspond to different process modules that can be executed locally on an augmented reality system or that can be executed remotely via an augmented reality cloud server to provide the feature point extraction for the acquired image frame;
prior to implementing at least one augmented reality process instance of the plurality of augmented reality process instances on either the augmented reality system or the augmented reality cloud server, determining a plurality of local feature extraction time estimates for the plurality of augmented reality process instances based on the plurality of acquired image frame parameters, wherein a respective local feature extraction time estimate is determined for each of the plurality of augmented reality process instances, wherein each of the plurality of local feature extraction time estimates provides an estimated amount of time to extract feature points from the acquired image frame in response to a respective augmented reality process instance being locally executed on the augmented reality system;
obtaining a network condition measurement;
generating a plurality of offload commands such that an offload command is generated for each of the plurality of augmented reality process instances that could be used to extract the feature points from the acquired image frame, wherein generating each of the plurality of offload commands is based on the network condition measurement and at least one of the plurality of local feature extraction time estimates; and
selecting one offload command from the plurality of offload commands so as to activate a respective augmented reality process instance.

16. The computer storage medium of claim 15, wherein generating the plurality of offload commands is based on determining whether a dynamic acquired image frame parameter associated with the acquired image frame exceeds an offload time differential threshold for each of the plurality of augmented reality process instances, wherein determining the plurality of augmented reality process instances comprises retrieving augmented reality process identifiers corresponding to the plurality of augmented reality process instances, and wherein the offload command instructs an augmented reality cloud controller to use an augmented reality process identifier to execute a corresponding augmented reality process instance from among the plurality of augmented reality process instances.

17. The computer storage medium of claim 16, wherein each offload command is associated with a respective one of the plurality of augmented reality process instances.

18. The computer storage medium of claim 17, wherein each offload command includes one of a command to offload the acquired image frame as a raw file to a cloud server, or a command to offload the feature points from the acquired image frame to the cloud server.

19. The computer storage medium of claim 18, wherein the command to offload the feature points from the acquired image frame to the cloud server is based on determining that the dynamic acquired image frame parameter exceeds the offload time differential threshold corresponding to one of the plurality of augmented reality process instances.

20. The computer storage medium of claim 16, wherein the operations further comprise activating one of the plurality of offload commands for the acquired image frame.

* * * * *